United States Patent
Zhan et al.

(10) Patent No.: US 8,236,162 B2
(45) Date of Patent: Aug. 7, 2012

(54) ELECTROEROSION MACHINING SYSTEM AND METHOD FOR ELECTRODE WEAR COMPENSATION

(75) Inventors: Yimin Zhan, Shanghai (CN); Bin Wei, Mechanicville, NY (US); Michael Scott Lamphere, Hooksett, NH (US); Renwei Yuan, Shanghai (CN); Yuanfeng Luo, Shanghai (CN)

(73) Assignee: General Electric Company, Niskayuna, NY (US)

( * ) Notice: Subject to any disclaimer, the term of this patent is extended or adjusted under 35 U.S.C. 154(b) by 937 days.

(21) Appl. No.: 12/241,129

(22) Filed: Sep. 30, 2008

(65) Prior Publication Data

US 2010/0078333 A1 Apr. 1, 2010

(51) Int. Cl.
- B23H 3/00 (2006.01)
- B23H 5/00 (2006.01)
- B23H 7/00 (2006.01)
- B23H 9/00 (2006.01)
- B23H 11/00 (2006.01)
- C25F 3/00 (2006.01)
- C25F 7/00 (2006.01)
- H05K 3/07 (2006.01)
- B23H 9/10 (2006.01)
- C25D 17/00 (2006.01)
- B23K 9/00 (2006.01)

(52) U.S. Cl. ...... 205/651; 205/686; 204/218; 219/69.11

(58) Field of Classification Search .................. 219/68, 219/69.17; 204/640
See application file for complete search history.

(56) References Cited

U.S. PATENT DOCUMENTS

| | | | |
|---|---|---|---|
| 4,345,131 A | 8/1982 | Semon et al. | |
| 4,436,976 A * | 3/1984 | Inoue | 219/69.2 |
| 5,919,380 A | 7/1999 | Magara et al. | |
| 6,454,930 B1 | 9/2002 | Derighetti | |
| 6,642,470 B2 | 11/2003 | Tricarico et al. | |
| 7,301,116 B2 | 11/2007 | Chen et al. | |
| 2004/0124078 A1 | 7/2004 | Wei et al. | |
| 2005/0247569 A1* | 11/2005 | Lamphere et al. | 205/663 |
| 2007/0228017 A1 | 10/2007 | Wei et al. | |
| 2007/0256939 A1* | 11/2007 | Wei et al. | 205/674 |

* cited by examiner

Primary Examiner — Sam P Siefke
Assistant Examiner — Bryan Kilpatrick
(74) Attorney, Agent, or Firm — Penny A. Clarke

(57) ABSTRACT

An electroerosion machining system comprises an electrode, a power supply, an electrolyte supply, an electroerosion controller connected to and monitoring the power supply, and a working apparatus configured to move the electrode relative to the workpiece. The electroerosion machining system further comprises a CNC controller configured to cooperate with the electroerosion controller to control the working apparatus, and to calculate a wear value of the electrode. Further, the CNC controller is configured to segment the toolpath of every layer into a plurality of segments, and to divide the compensation value for every layer to be machined into a plurality of value segments, and further to use the value segments to compensate for electrode wear along the respective toolpath segments during machining of the workpiece. An electroerosion machining method is also presented.

12 Claims, 2 Drawing Sheets

ELECTROEROSION MACHINING SYSTEM AND METHOD FOR ELECTRODE WEAR COMPENSATION

BACKGROUND

This invention relates generally to machining systems and methods for electrode wear compensation. More particularly, this invention relates to electroerosion machining systems and methods for electrode wear compensation.

Electrochemical machining (ECM) and electrical discharge machining (EDM) are conventional processes for machining material in objects such as gas turbine components. ECM processes typically pass an electrical current in the gap between an electrode(s) and a workpiece for precision removal of amounts of material on the workpiece to achieve a desired final configuration thereof with substantially smooth surfaces. EDM processes circulate a dielectric liquid between an electrode(s) and a workpiece, and electrical discharges are generated in the gap between the electrode and the workpiece.

Both ECM and EDM processes use electrical current under direct-current (DC) voltage to electrically power removal of the material from the workpiece. However, in ECM an electrolyte (an electrically conductive liquid) is circulated between the electrode(s) and the workpiece for permitting electrochemical dissolution of the workpiece material, as well as cooling and flushing the gap region therebetween. In contrast, EDM processes circulate a nonconductive (dielectric) liquid in the gap to permit electrical discharges in the gap to remove the workpiece material. As used herein, the term "electroerosion" should be understood to apply to those electromachining processes that circulate an electrolyte (electrically conductive liquid) in the gap between the electrode(s) and the workpiece, these processes enabling a high rate of material removal and reducing thermal damages to the workpiece.

However, during electroerosion machining of the workpiece, the electrode undergoes wear and becomes shorter over time so that machined surfaces of the workpiece may not be smooth and predetermined machining depths may not be reached, which are definitely disadvantageous to electroerosion machining of the workpiece.

Therefore, there is a need for a new and improved electroerosion machining method and system for electrode wear compensation.

BRIEF DESCRIPTION

An electroerosion machining system is provided in accordance with one embodiment of the invention. The electroerosion machining system comprises an electrode configured to machine a desired configuration in a workpiece, a power supply configured to energize the electrode and the workpiece to opposite electrical polarities, an electrolyte supply configured to pass an electrolyte between the electrode and the workpiece, an electroerosion controller connected to and monitoring the power supply, and a working apparatus configured to move the electrode relative to the workpiece. The electroerosion machining system further comprises a CNC controller configured to cooperate with the electroerosion controller to control the working apparatus to move the electrode to machine the workpiece layer by layer according to a plurality of toolpaths predetermined in the CNC controller, and to calculate a wear value of the electrode after machining one or more of a plurality of layers to determine a compensation value for next one or more layers of the workpiece. Further, the CNC controller is configured to associate the compensation value with each of the next one or more layers, to divide the compensation value for each layer to be machined into a plurality of value segments, to segment the toolpath of each layer into a plurality of toolpath segments, and to use the value segments to compensate for electrode wear along the respective toolpath segments during machining of the workpiece.

Another embodiment of the invention provides an electroerosion machining method. The electroerosion machining method comprises driving an electrode to move relative to a workpiece; passing an electric current between the electrode and the workpiece while circulating an electrolyte therebetween to machine a desired configuration in the workpiece layer by layer according to a plurality of predetermined toolpaths; calculating a wear value of the electrode after machining one or more of a plurality of layers to determine a compensation value for a next one or more layers of the workpiece; associating the compensation value with each of the next one or more layers; dividing the compensation value for each layer to be machined into a plurality of value segments; segmenting the toolpath of each layer into a plurality of toolpath segments; and using the value segments to compensate for electrode wear along the respective toolpath segments during machining of the workpiece.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Embodiments of the present disclosure will be described hereinbelow with reference to the accompanying drawings. In the following description, well-known functions or constructions are not described in detail to avoid obscuring the disclosure in unnecessary detail.

Figure 1:
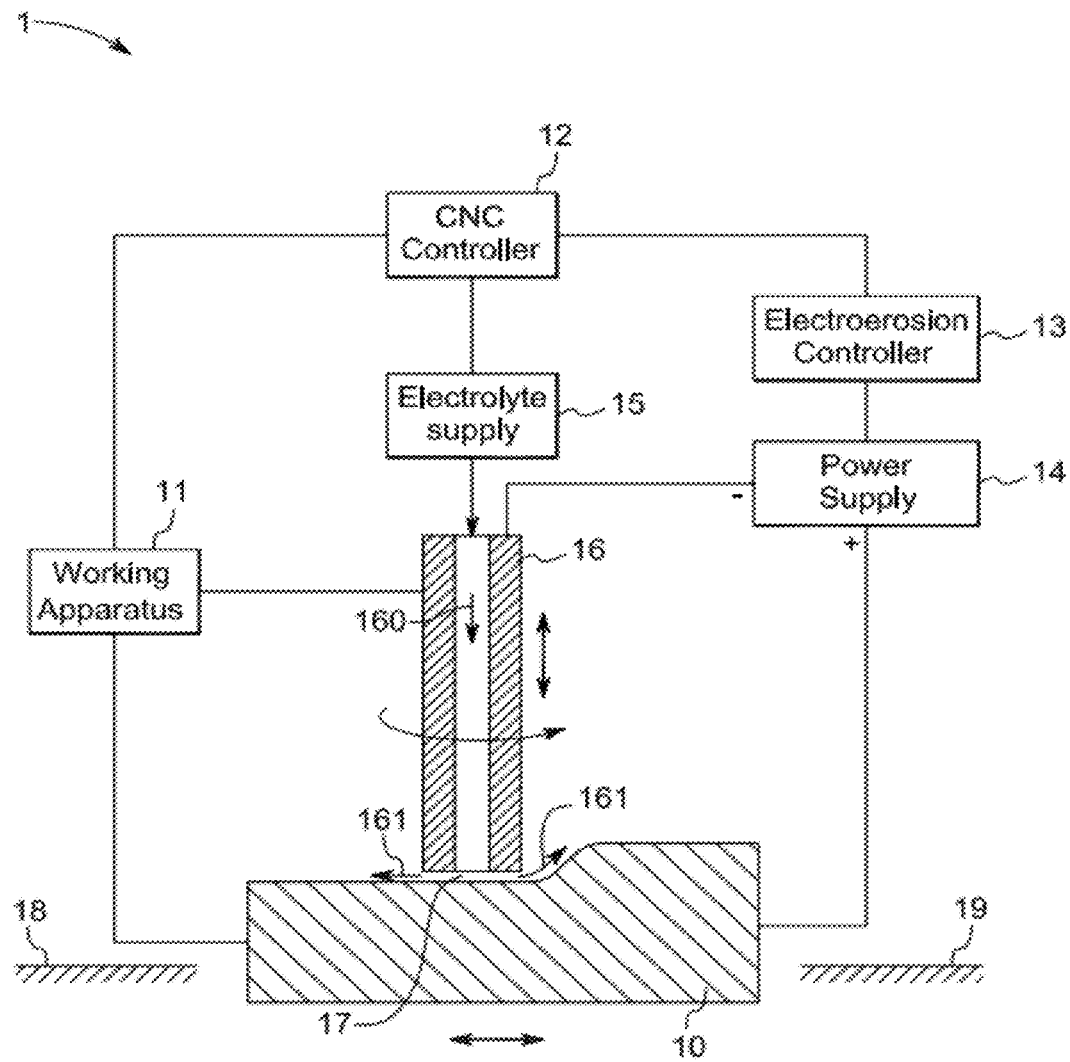
FIG. 1 is a schematic diagram of an electroerosion machining system in accordance with one embodiment of the invention.

FIG. 1 illustrates a schematic diagram of an electroerosion machining system in accordance with one embodiment of the invention. In embodiment of the invention, the electroerosion machining system 1 is used to remove material from a workpiece 10 layer by layer to form a desired configuration. As illustrated in FIG. 1, the electroerosion machining system 1 comprises a numerical control (NC) or computer numerical control (CNC) device (not shown) including a working apparatus 11 and a CNC controller 12, an electroerosion controller 13, a power supply 14, an electrolyte supply 15, and an electrode 16.

In embodiments of the invention, the NC or the CNC device can be used to perform traditional automated machining. In particular examples, the working apparatus 11 may comprise a machine tool or lathe including servomotors (not shown) and spindle motors (not shown), which are known to one skilled in the art. The electrode 16 is mounted on the working apparatus 11 for performing electroerosion machining. Accordingly, the servomotors may drive the electrode 16 and the workpiece 10 to move opposite to each other at a desired speed and path, and the spindle motors drive the electrode 16 to rotate at a desired speed.

The CNC controller 12 comprises pre-programmed instructions based on descriptions of the workpiece 10 in a computer-aided design (CAD) and/or a computer-aided manufacturing (CAM), and is connected to the working apparatus 11 to control the working apparatus 11 to drive the electrode 16 to move and/or rotate according to certain operational parameters, such as certain feedrates, axes positions, or spindle speeds etc. In one non-limiting example, the CNC controller 12 may be a general CNC controller and comprise central processing units (CPU), read only memories (ROM), and/or random access memories (RAM), as known to one skilled in the art. In one non-limiting example, the CNC controller 12 comprises a controller, sold under the tradename GE-FANUC 18i CNC, by GE-Fanuc, of Charlottesville, Va.

In the illustrated embodiment, the power supply 14 comprises a direct current (DC) pulse generator. The electrode 16 and the workpiece 10 are connected to negative and positive poles of the power supply 14, respectively. Accordingly, in embodiments of the invention, the electrode 16 may function as a cathode and the workpiece 10 may act as an anode. In other embodiments, the polarities on the electrode 16 and the workpiece 10 may be reversed.

The electroerosion controller 13 is connected to the power supply 14 to monitor the status of the power supply 14. In one embodiment, the electroerosion controller 13 may comprise one or more sensors (not shown), such as a voltage and/or current measurement circuit for monitoring the status of voltages and/or currents in a gap 17 between the electrode 16 and the workpiece 10. In other embodiments, the sensor(s) may be disposed in the power supply 14 or be disposed separately. In non-limiting examples, the electroerosion controller 13 may comprise a microprocessor or another computational device, a timing device, a voltage comparison device, and/or a data storage device etc. to be served as the sensor(s), as known to one skilled in the art. Additionally, the electroerosion controller 13 also communicates with the CNC controller 12 to control the power supply 14 and the movement of the working apparatus 11 holding the electrode 16. In one non-limiting example, the electroerosion controller 13 comprises a controller, sold under the tradename NI CompactRIO (cRIO), by National Instruments Inc., of Austin, Tex.

In one example, the electrolyte supply 15 may be in communication with and receive the pre-programmed instructions from the CNC controller 12 for passing an electrolyte between the electrode 16 and the workpiece 10. Alternatively, the electrolyte supply 15 may be disposed separately. Thus, in electroerosion machining, the power supply 14 may pass a pulse electric current between the electrode 16 and the workpiece 10 to remove material from the workpiece 10 layer by layer for forming a desired configuration while the electrolyte carries the removed material out of the gap 17. In the illustrated embodiment, the electrode 16 comprises a tubular cross-section. Arrows 160 and 161 indicate the circulation directions of the electrolyte. In other embodiments, the electrode 16 may have other configurations, as known to one skilled in the art.

In embodiments of the invention, at least one trigger point may be provided to serve as reference points for contacting the electrode 16 in a tool-touch mode. In the illustrated embodiment, a first and second trigger point 18 and 19 are located fixedly in front of and behind the workpiece 10, respectively. Accordingly, prior to and after electroerosion machining of one or more layers of the workpiece 10, the CNC controller 12 may control the working apparatus 11 to drive the electrode 16 to contact the trigger points 18 and 19 respectively to determine lengths of the electrode 16. Alternatively, only one trigger point 18 or 19 may be employed. In one non-limiting example, the trigger points may be predetermined on separated reference objects (not shown), such as clamps of the workpiece etc. Alternatively, the trigger points may be predetermined on the workpiece 10.

Figure 2:
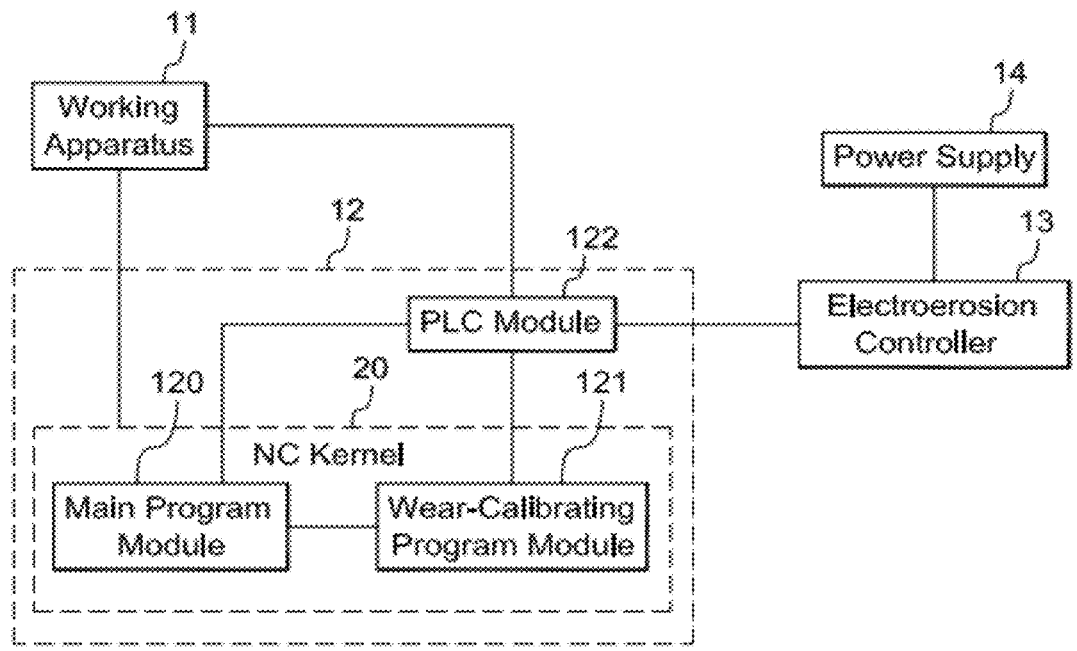
FIG. 2 is a schematic diagram of a control subsystem of the electroerosion machining system shown in FIG. 1.

FIG. 2 illustrates a schematic diagram of a control subsystem of the electroerosion machining system 1. As illustrated in FIG. 2, the CNC controller 12 comprises a NC kernel 20 comprising a main program module 120 and a wear-calibrating program module 121, and a programmable logic control (PLC) (or programmable machine control (PMC)) module 122. The NC kernel 20 cooperates with the PLC module 122 to control the working apparatus 11 and to communicate with the electroerosion controller 13. In embodiments of the invention, the main program module 120 comprises the pre-programmed instructions, such as toolpaths etc. A path that the electrode 16 takes along the workpiece 10 is referred to as a toolpath. The PLC module 122 performs various operations, which may be related to sequence, such as tool-change, starting or stopping of the motors, workpiece-change, and switching on/off the electrolyte supply etc.

Additionally, the wear-calibrating program module 121 may be executed in the tool-touch mode for determining the length of the electrode 16 prior to or after machining, and for communicating with the main program module 120, the PLC module 122, and the electroerosion controller 13 to perform certain operations in the tool-touch mode (described below). In one embodiment, the wear-calibrating program module 121 may be embedded in the main program module 120 both being programmed in the NC kernel 20 that is known to one skilled in the art.

Accordingly, as illustrated in FIGS. 1-2, at the beginning of electroerosion machining, the main program module 120 may send preset initial voltage and/or current parameters for electroerosion machining to the power supply 14 after the initial parameters pass through the PLC module 122 and the electroerosion controller 13. Meanwhile, the main program module 120 cooperates with the PLC module 122 to control the working apparatus 11 to drive the electrode 16 to move above the trigger point 18 according to the pre-programmed instructions therein from a position offset from the trigger point 18.

Next, the machining system 1 goes into the tool-touch mode. At this point, the wear-calibrating program module 121 may send initial voltage and/or current parameters for the tool-touch mode to the power supply 14. In some embodiments, values of the initial voltage and/or current parameters for the tool-touch mode may be smaller than values of the initial voltage and/or current parameters for electroerosion machining to avoid damaging the electrode 16. Then, the electrode 16 moves down gradually until contacting the trigger point 18 so that a short circuit occurs between the electrode 16 and the trigger point 18. The electroerosion controller 13 measures the short circuit voltage, and generates and outputs a short circuit trigger signal to the wear-calibrating program module 121. Then, the wear-calibrating program module 121 communicates with the main program module 120 and the PLC module 122 to control the working apparatus 11 to pull back the electrode 16 rapidly to a preset distance from the trigger point 18, and calculates the length of the electrode 16 simultaneously. In one example, the preset distance may be defined in the wear-calibrating program module 121.

Subsequently, after finishing the tool-touch mode, the initial voltage and/or current parameters for the normal machining are restored. The main program module 120 cooperates with the PLC module 122 to instruct the working apparatus 11 to drive the electrode 16 to begin to machine a first layer of the workpiece 10 according to the pre-programmed toolpath in the main program module 120. In some embodiments, values of the voltage and/or current parameters during machining may be the same as or different from the values of the initial parameters, which is regulated by the electroerosion controller 13. Additionally, the electroerosion controller 13 may monitor the status of the voltage and/or current between the electrode 16 and the workpiece 10 during machining.

In some embodiments, during machining of the first layer, the working apparatus 11 moves the electrode 16 down to compensate for electrode wear along the preset toolpath according to an experimental compensation value. In certain embodiments, each toolpath may be segmented into a plurality of toolpath segments, and the experimental compensation value may also be divided into a plurality of value segments to compensate for electrode wear along the respective segments of the toolpath (or toolpath segments). For example, the toolpath may be divided into N toolpath segments, and the experimental compensation value may also be divided into N value segments. Thus, each of value segments is used to compensate for electrode wear along the respective segment of the toolpath. In some embodiments, values of the value segments may be the same or different. According to a particular example, the compensation is performed by adjusting the distance between the electrode and the workpiece based on the compensation value. More particularly, the compensation comprises reducing the distance between the electrode and the workpiece based on the value segment associated with the respective toolpath segment.

After finishing machining of the first layer, the controlled working apparatus 11 moves the electrode 16 rapidly above the trigger point 19, or the trigger point 18 when only one trigger point is employed. Next, the machining system 1 goes into the tool-touch mode again. Similar to the tool-touch mode employed prior to machining of the first layer, the wear-calibrating program module 121 communicates with the main program module 120 and the PLC module 122 so that the working apparatus 11 is controlled to pull back the electrode 16 rapidly, and calculates the length of the electrode 16 after machining of the first layer simultaneously. Further, the wear-calibrating program module 121 calculates a wear value between the length of the electrode 16 prior to machining the first layer and the length of the electrode after machining of the first layer and determines a compensation value based on the wear value in the first layer.

Subsequently, the compensation value is associated (distributed) to a second layer to be machined. Then, the machining system 1 machines the second layer of the workpiece 10 and compensates for the wear of the electrode 16 during machining the second layer based on the compensation value calculated after the first layer. Similar to the segmentable compensation performed for the first layer, the compensation value may also be divided into a plurality of value segments to be used to compensate for wear of the electrode along the respective segments of a toolpath (toolpath segments) for machining the second layer.

In embodiments of the invention, a compensation value based on a wear value of the electrode 16 in one layer may be divided into a plurality of value segments, and a toolpath for a next layer may also be segmented into a plurality of toolpath segments. In some embodiments, the number of value segments may be equal to the number of the toolpath segments. Thus, each of the value segments in one layer may be used to compensate for the electrode wear along the respective segment of the toolpath for the next layer. In certain embodiments, the compensation value for the first layer may be predetermined from experimental data.

In other embodiments, the machining system 1 may be configured to calculate a wear value of the electrode 16 every N layers, such as every 3 layers. It should be noted, that this 3 layer example is merely illustrative and is non-limiting. That is, the machining system 1 may be configured to calculate the actual wear value after machining of the N layers, and compensate for wear of the electrode 16 for machining of the next N layers. In one example, the machining system 1 compensates for wear to the electrode 16 during machining of the first 3 layers of the workpiece 10 according to experimental data. After finishing the first 3 layers, the machining system 1 measures the actual wear value in the first 3 layers and determines the compensation value for the second 3 layers.

Similar to the segmentable compensation of each layer, the compensation value may be associated to each layer to be machined. Namely, the compensation value may be distributed to each layer first, and then, be distributed to each of segments of the toolpath for each layer. In certain embodiments, the compensation value distributed to each layer may be the same, and the compensation value distributed on each segment of each layer may also be the same. Subsequently, a third 3 layers may be compensated based on the measured wear value in the second 3 layers. The rest may be deduced by analogy. In certain embodiments, the toolpaths of different layers may be the same or different.

In embodiments of the invention, the main program module 120 may employ a preset feedrate F to control the working apparatus 11 to move the electrode 16 to perform electroerosion machining along the pre-programmed toolpath(s). Additionally, the electroerosion controller 13 may monitor the status of the voltage and/or current in the gap 17, and cooperate with the CNC controller 12 to adjust the preset feedrate F by a feedrate override (FO) (for example, 0%-100%, 200% or 254%, depending on a maximum feedrate of electroerosion machining) and analog voltage outputs therein. Thus, the working apparatus 11 may move the electrode 16 according to adjusted feedrates. In one example, during electroerosion machining, assuming the feedrate override is 254%, the electroerosion controller 13 defines a maximum analog voltage output of 10 volts, and outputs a real-time analog voltage output of V volts, as known to one skilled in the art. Thus, a real-time feedrate F' may be expressed as F'=(254%/10)*V*F, such that the working apparatus 11 moves the electrode 16 according to the real-time feedrate F'.

Additionally, the electroerosion controller 13 may cooperate with the CNC controller 12 for jump up/down control of the electrode 16 during electroerosion machining. "Jump Up/Down" indicates the electrode 16 jumps up and restores rapidly for a failsafe control when a short circuit arises between the electrode 16 and the workpiece 10. Traditional CNC machines generally have a "Tool Retraction and Recovery" (TRR) function, that moves the electrode 16 up by a predetermined distance away from the workpiece 10 for checking the status of the electrode 16 and the workpiece 10. The TRR function, then returns to the normal machining status to restart. In one example, the TRR function may be stored in the PLC module 122, and the jump distance may be preset in the main program module 120.

Figure 3:
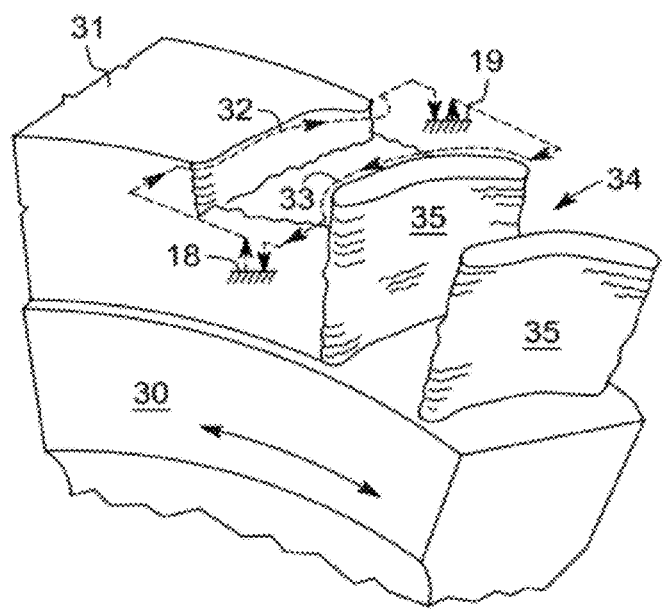
FIG. 3 is a schematic diagram of electroerosion machining of bladed disks.

In some embodiments, the electroerosion machining system 1 may be used for machining a workpiece to form rough bladed disks. FIG. 3 illustrates a schematic diagram of electroerosion machining of bladed disks 35. As illustrated in FIG. 3, the electrode 16 may be first located above a middle portion (not shown) of a surface 31 of a workpiece 30 to be machined. In one non-limiting example, the working apparatus 11 moves the electrode 16 to machine a first part and a second part (not labeled) of a desired area along a first toolpath 32 and a second toolpath 33 respectively to form grooves 34 in the workpiece 30 so as to form bladed disks 35. Then, similar to the electroerosion machining in FIGS. 1-2, the electrode 16 is first moved to contact the trigger point 18 to calculate the length of the electrode 16, then, to machine a first layer of a first part along the first toolpath 32. After finishing machining along the first toolpath 32 on a first layer of the first part, the machining tool 11 moves the electrode 16 to contact the trigger point 19 to calculate the length of the electrode 16 again. At this time, a first wear value prior to and after the machining along the first toolpath 32 on the first layer of the first part is determined, and a first compensation value for a second layer of the first part along the first toolpath 32 is determined accordingly.

Subsequently, the machining tool 11 moves the electrode 16 to perform electroerosion machining of the second part along the second toolpath 33, and after finishing machining along the second toolpath 33 on a first layer of the second part, to contact the trigger point 18 again to calculate the length of the electrode 16. Thus, a second wear value, prior to and after machining along the second toolpath 33 on the first layer of the second part, is determined, and a second compensation value for a second layer of the second part along the second toolpath 33 is determined accordingly. The rest may be deduced by analogy.

Similarly, the compensation values in the first and second toolpaths 32 and 33 may be predetermined and compensated segmentably according to experimental data. And the compensation value may be calculated for each layer and be compensated segmentably into a next layer. Alternatively, the compensation value may be determined and compensated every 2 or more layers. Additionally, when a batch of similar electrodes are used for electroerosion machining of a workpiece, the calculated wear values generated from one or more previous electrodes may be stored and used to compensate for wear to latter electrodes. In other embodiments, the wear value of each of the batch of electrodes may be calculated.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. An electroerosion machining system, comprising:
   an electrode configured to machine a desired configuration in a workpiece;
   a power supply configured to energize the electrode and the workpiece to opposite electrical polarities;
   an electrolyte supply configured to pass an electrolyte between the electrode and the workpiece;
   an electroerosion controller connected to and monitoring the power supply;
   a working apparatus configured to move the electrode relative to the workpiece; and
   a CNC controller configured to:
   cooperate with the electroerosion controller to control the working apparatus to move the electrode to machine the workpiece layer by layer according to a plurality of toolpaths predetermined in the CNC controller,
   calculate a wear value of the electrode after machining one or more of a plurality of layers to determine a compensation value for a next one or more layers of the workpiece,
   associate the compensation value with each of the next one or more layers,
   divide the compensation value for each layer to be machined into a plurality of value segments,
   segment the toolpath of each layer into a plurality of toolpath segments, and
   use the value segments to compensate for electrode wear along the respective toolpath segments during machining of the workpiece.

2. The electroerosion machining system of claim 1, wherein the CNC controller comprises a NC kernel comprising a main program module and a wear-calibrating program module in communication with the main program module, and a PLC module in communication with the NC kernel.

3. The electroerosion machining system of claim 2, wherein the CNC controller communicates with the working apparatus and the electroerosion controller.

4. The electroerosion machining system of claim 3, wherein the CNC controller cooperates with the electroerosion controller to control the working apparatus to move the electrode to touch one or more trigger points prior to and after machining one or more layers to calculate the wear value of the electrode after machining the one or more layers.

5. The electroerosion machining system of claim 4, wherein the electroerosion controller generates and outputs a short circuit trigger signal to the wear-calibrating program module when the electrode touches the trigger point for calculating a length of the electrode in the wear-calibrating program module.

6. The electroerosion machining system of claim 5, wherein the electroerosion controller comprises a sensor for at least monitoring voltages between the electrode and the trigger point or the workpiece.

7. The electroerosion machining system of claim 5, wherein after the electrode touches a respective one of the trigger points, the wear-calibrating program module communicates with the main program module and the PLC module to control the working apparatus to pull back the electrode with a distance preset in the wear-calibrating program module from the respective trigger point.

8. The electroerosion machining system of claim 2, wherein the wear-calibrating program module is embedded in the main program module.

9. The electroerosion machining system of claim 1, wherein the desired configuration comprises a bladed disk.

10. The electroerosion machining system of claim 1, wherein the power supply comprises a direct current pulse power supply.

11. The electroerosion machining system of claim 1, wherein the working apparatus comprises a machine tool.

12. The electroerosion machining system of claim 1, wherein a number of the value segments is equal to a number of the toolpath segments.

* * * * *